(12) United States Patent
Sugimoto (10) Patent No.: US 7,573,236 B2
(45) Date of Patent: Aug. 11, 2009

(54) APPARATUS AND METHOD FOR ADJUSTING CAPACITY IN A BATTERY SET

(75) Inventor: Tomonaga Sugimoto, Fujisawa (JP)

(73) Assignee: Nissan motor Co. Ltd., Yokohama-shi, Kanagawa (JP)

( * ) Notice: Subject to any disclaimer, the term of this patent is extended or adjusted under 35 U.S.C. 154(b) by 350 days.

(21) Appl. No.: 11/297,902

(22) Filed: Dec. 9, 2005

(65) Prior Publication Data

US 2006/0125447 A1 Jun. 15, 2006

(30) Foreign Application Priority Data

Dec. 10, 2004 (JP) .............................. 2004-358130

(51) Int. Cl.
*H02J 7/00* (2006.01)
(52) U.S. Cl. .................... 320/132; 320/104; 320/122
(58) Field of Classification Search ................ 320/132, 320/104, 122
See application file for complete search history.

(56) References Cited

U.S. PATENT DOCUMENTS 5,998,969 A * 12/1999 Tsuji et al. ................... 320/132
2002/0011820 A1 * 1/2002 Suzuki et al. ................ 320/132

FOREIGN PATENT DOCUMENTS

JP 2004-31012 1/2004

* cited by examiner

*Primary Examiner*—Adolf Berhane
*Assistant Examiner*—Yalkew Fantu
(74) *Attorney, Agent, or Firm*—Young Basile (57) ABSTRACT

A device to adjust the capacity of battery cells includes a controller that adjusts the cells to reduce the rate of heat generation in capacity adjustment. When capacity adjustment of cells that form battery set is performed, the capacity adjustment target cells are divided into multiple groups. When the capacity adjustment of the capacity adjustment target cells in one group comes to an end, the cells in the next group are adjusted. As a result, it is possible to reduce the rate of heat generation as compared with the case when capacity adjustment is performed for all of the capacity adjustment target cells at the same time.

19 Claims, 6 Drawing Sheets

APPARATUS AND METHOD FOR ADJUSTING CAPACITY IN A BATTERY SET

BACKGROUND

The present invention pertains to capacity adjustment of multiple cells of a battery set.

Japanese Kokai Patent Application No. 2004-31012 discloses a type of device with the following function: while the open circuit voltage of plural cells that form a battery set is detected with a voltage detector, the charge capacity SOC is detected, and, based on the detected open voltage and charge capacity SOC, the charge capacity of each cell is adjusted. With this capacity adjustment device, discharge is performed for each cell via a discharge resistor connected in parallel to each cell, so as to ensure uniform voltage of the various cells. However, this approach may result in generation of excess heat.

SUMMARY

For the capacity adjusting device of a battery set of the present invention, the discharge of battery set cells is controlled such that discharge of cells takes place during staggered time periods, so that the rate of heat generation in capacity adjustment can be reduced.

In accordance with one aspect of the invention, an apparatus is provided for adjusting the capacity of a battery set having multiple cells, including target cells that require capacity adjustment. The apparatus includes a capacity adjusting circuit adapted for connection to the cells and responsive to the voltage of the target cells to asynchronously commence discharge of the target cells until the voltages across the target cells reach a prescribed level.

In accordance with another aspect of the invention, a method is provided for controlling a battery set having multiple cells, including target cells that require capacity adjustment. The method includes detecting the voltage of the target cells; during a first time period, discharging at least a first target cell until its voltage reaches a prescribed level; and during a second time period that is offset from the first time period, discharging a second target cell until its voltage reaches a prescribed level.

BRIEF DESCRIPTION OF THE DRAWINGS

The description herein makes reference to the accompanying drawings wherein like reference numerals refer to like parts throughout the several views, and wherein.

DETAILED DESCRIPTION

First Embodiment

Figure 1:
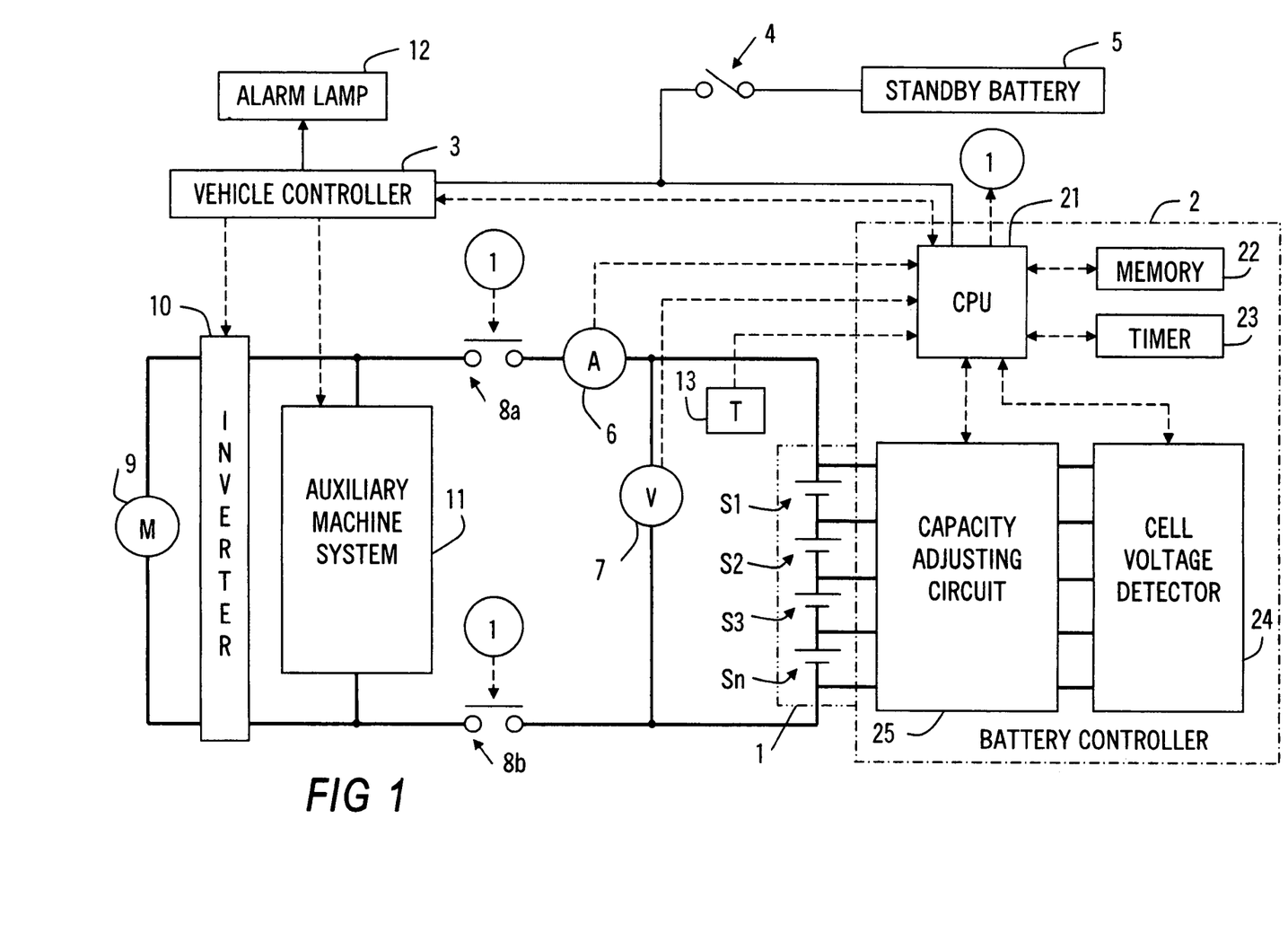
FIG. 1 is a block diagram of a device for adjusting the capacity of a battery set in accordance with a first embodiment of the invention.

FIG. 1 is a diagram illustrating the constitution of the first embodiment in which the capacity adjustment device of the battery set of the present invention is adopted in an electric automobile. In FIG. 1, high-current lines are indicated by thick lines, low-current lines are indicated by fine lines, and control signal lines are indicated by broken lines. This electric automobile runs with motor generator 9 (hereinafter to be referred to as motor 9) as the driving source for running.

For example, battery set 1 is made of n (n is a natural number, such as n=96) cells of nickel-hydrogen batteries s1-sn connected in tandem. The battery set 1 is connected via current sensor 6 and main relays 8a, 8b to inverter 10 and auxiliary machine system 11. DC power is fed to the inverter 10 and auxiliary machine system 11. The inverter 10 converts the DC power fed from battery set 1 into AC power that is then fed to AC motor 9. Also, inverter 10 can convert AC power generated by motor 9, which performs regeneration braking as the vehicle is braked, to DC power that is then used in charging battery set 1.

Vehicle controller 3 controls inverter 10 and auxiliary machine system 11, and it controls running of the vehicle and operation of the auxiliary machinery. Here, auxiliary machine system 11 includes the air conditioner, lamps, wipers, etc. The control power is fed from standby battery 5 to vehicle controller 3 and battery controller 2 (to be explained later) via main switch 4. Here, main switch 4 corresponds to the ignition switch of the automobile as the source in turning ON the engine. It is ON (closed circuit) when the main key (not shown in the figure) of the electric automobile is set in the "running" position.

The current sensor 6 detects the discharge current flowing from battery set 1 to inverter 10 and the charging current flowing from inverter 10 to battery set 1, and outputs the detected signal to CPU 21 of battery controller 2 to be explained later. Main relays 8a, 8b are turned ON/OFF by CPU 21, and they act to connect/open the high-current lines, that is, connection/disconnection between battery set 1 and inverter 10. Voltage sensor 7 detects the total voltage of a battery set 1, and outputs it to CPU 21.

Temperature sensor 13 detects the temperature of a battery set 1, and outputs the signal to CPU 21. Also, temperature sensor 13 is set near a control panel (not shown) of battery controller 2. That is, the temperature detected with temperature sensor 13 reflects the temperature of the control panel. For example, alarm lamp 12 is turned ON in case of abnormality in the electric automobile, such as over-discharge of a battery set 1, etc., to let the driver/passenger know of the abnormal state.

The battery controller 2 has the following parts set on the control panel: CPU 21, memory 22, timer 23, cell voltage detector 24, and capacity adjustment circuit 25, and it controls charging and discharge of a battery set 1. The cell voltage detector 24 detects the voltage of each of cells s1-sn, and outputs the voltages to CPU 21.

Figure 2:
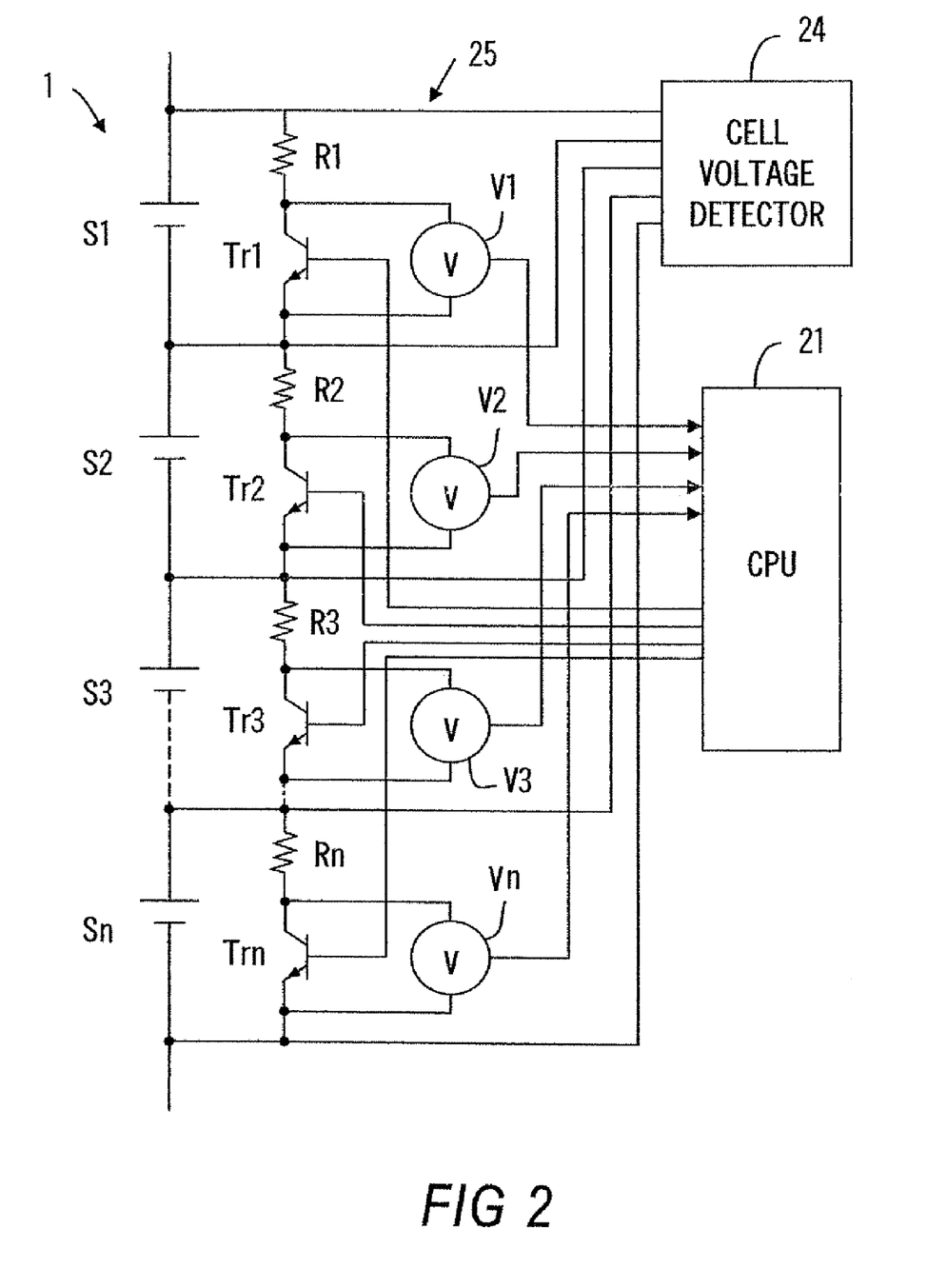
FIG. 2 is a partial schematic diagram of the capacity adjustment device shown in FIG. 1.

FIG. 2 is a diagram illustrating the constitution of the capacity adjustment circuit in detail. Connected in parallel to cell s1 is a series circuit of resistor R1 and transistor Tr1. Similarly, cells s2-sn are connected in parallel to series circuits made of resistors R2-Rn and transistors Tr2-Trn, respectively. Resistors R1-Rn are for discharge of cells S1-Sn. For example, when transistor Tr1 is ON, discharge is performed for cell s1 via resistor R1 connected in series with transistor Tr1. ON/OFF of transistors Tr1-Trn is controlled by CPU 21.

Voltage sensors V1-Vn are connected between the collectors and emitters of transistors Tr1-Trn, respectively. When transistors Tr1-Trn are turned ON, the voltage between the collector and emitter becomes nearly 0 V. When they are OFF, the voltage between the collector and emitter becomes equal to the voltage between the two terminals of cells s1-sn, respectively. By means of voltage sensor V1-Vn, CPU 21 monitors the voltage between the collector and emitter of transistors Tr1-Trn, and the state of operation of each of transistors Tr1-Trn, that is, the capacity adjustment state of each of cells s1-sn, is checked.

Figure 3:
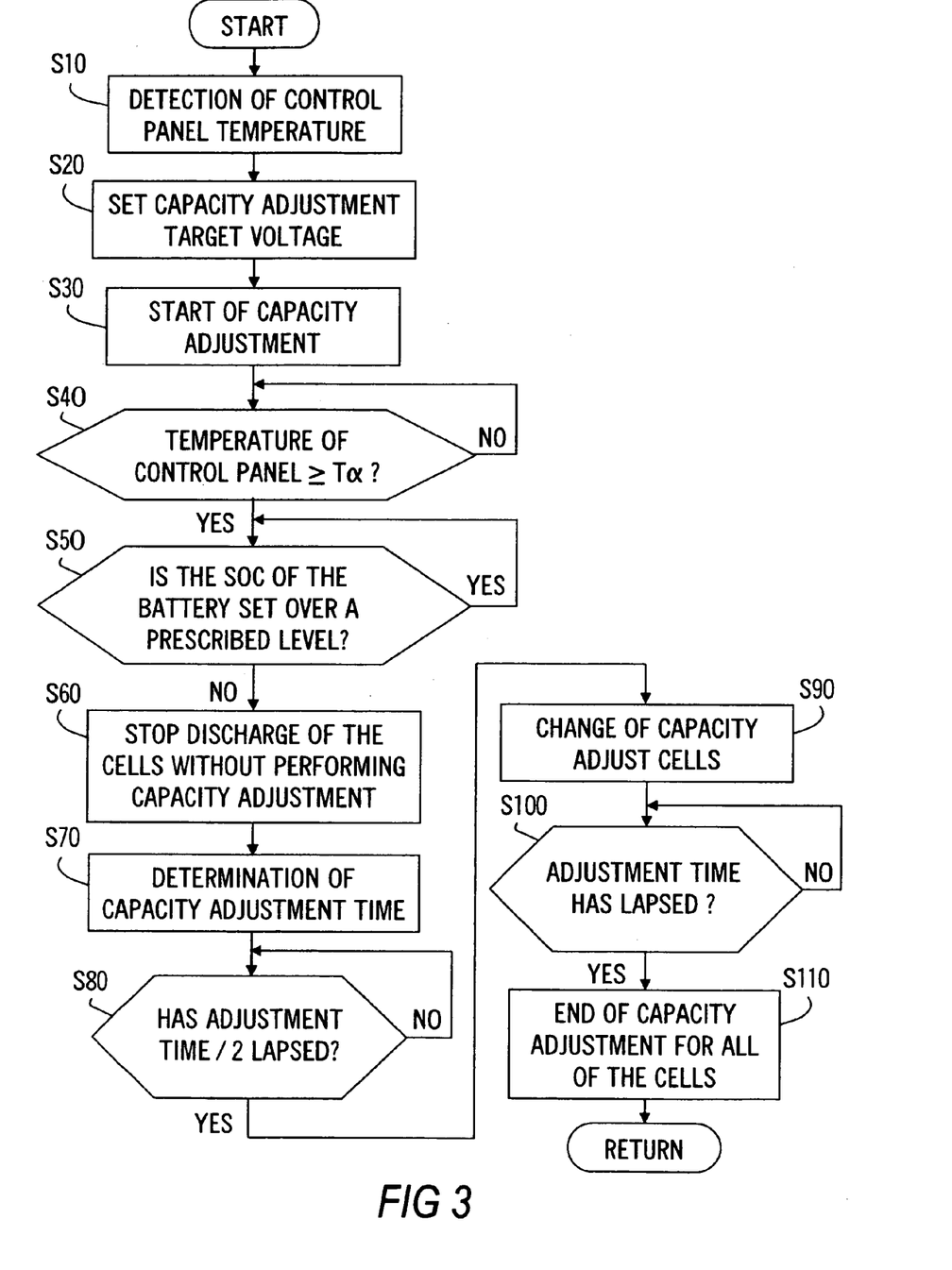
FIG. 3 is a flow chart of the operation of the device shown in FIG. 1.

FIG. 3 is a flow chart illustrating the contents of treatment performed by CPU 21 of battery controller 2. When the main key of the vehicle is turned ON, CPU 21 starts the treatment of step S10. In step S10, the surface temperature of the control panel of battery controller 2 is detected. As explained above, because temperature sensor 13 is set near the control panel, here, the surface temperature of the control panel is detected by temperature sensor 13 as a substitute for the temperature of a battery set 1.

In step S20 following step S10, the target voltage for the capacity adjustment of cells is set. In this case, cell voltage detector 24 is used to detect the voltage of each of cells s1 sn, and the voltage of the cell with the lowest voltage among the cell voltages detected is set as the capacity adjustment target voltage. Once the capacity adjustment target voltage is set, the process goes to step S30. In step S30, based on the capacity adjustment target voltage set in step S20, capacity adjustment is started. Then, among transistors Tr1-Trn, the transistors connected parallel to the cells other than the cell with the lowest cell voltage are turned ON, so that CPU 21 discharge is performed for the cells via the resistors connected in series with the ON transistors. Also, during capacity adjustment, CPU 21 monitors the cell voltages detected with cell voltage detector 24. Once a detected cell voltage reaches the capacity adjustment target voltage, the corresponding transistor is turned OFF. Also, after starting the capacity adjustment, timer 23 is used to start measurement of the discharge time.

In step S40 following step S30, whether the surface temperature of the control panel is over a prescribed temperature Tα is judged. This judgment is performed by means of following formula 1:

$$T0 + \text{discharge current} \times \text{resistance of resistor} \times \text{discharge time} \geq T\alpha \quad (1)$$

T0 represents the surface temperature of the control panel detected by temperature sensor 13 when the vehicle is started, and, for the discharge current and the resistances of resistors R1-Rn, values prepared beforehand are used. The discharge time refers to the time measured with timer 23. The prescribed temperature Tα is the upper limit temperature for use of the control panel, and it is determined beforehand.

In step S40, if judgment is made that formula 1 is not met, and the surface temperature of the control panel is lower than prescribed temperature Tα, the process stands by in step S40.

On the other hand, if formula 1 is met, and the temperature is equal to or higher than prescribed temperature Tα, the process goes to step S50. In step S50, whether the SOC of a battery set 1 is over a prescribed level (say, 90%) is judged. The SOC of a battery set 1 is determined based on the voltage value of a battery set 1 detected with voltage sensor 7. That is, a table indicating the relationship between the voltage of a battery set 1 and the SOC is prepared beforehand and is stored in memory 22. Based on this table and the voltage of a battery set 1 detected with voltage sensor 7, the SOC of a battery set 1 is determined. If the determined SOC is judged to be smaller than or equal to a prescribed value, the process goes to step S60 so as to perform treatment with staggered capacity adjustment timing for the cells for capacity adjustment. On the other hand, if the SOC of a battery set 1 is judged to be larger than the prescribed value, no treatment to stagger the capacity adjustment timing is performed, and the process stands by in step S50.

In step S60, in order to simultaneously stagger the capacity adjustment timing of the cells for capacity adjustment, the cells not performing capacity adjustment are determined, and discharge of the determined cells is stopped. This treatment will be explained in more detail below. As explained above, during capacity adjustment, CPU 21 monitors the cell voltages detected by cell voltage detector 24, and, as a detected cell voltage reaches the capacity adjustment target voltage, the corresponding transistor is turned OFF. Consequently, during the period of capacity adjustment, a mixture of ON transistors and OFF transistors exists.

Figure 4:
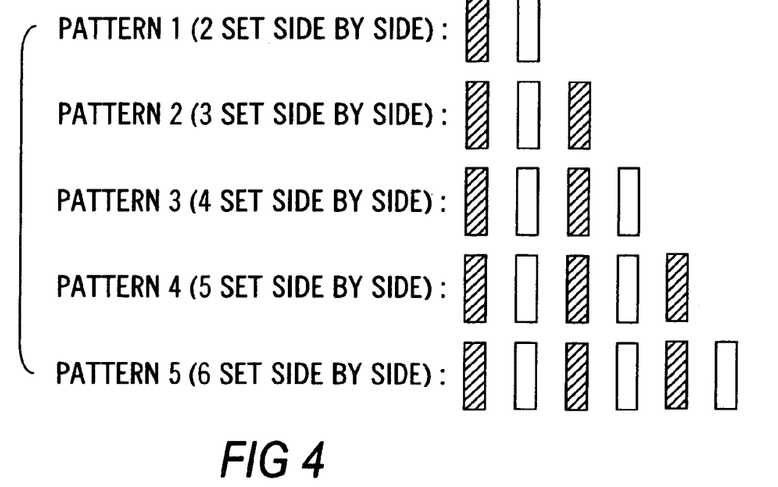
FIG. 4 is a diagram illustrating the switching ON and OFF of the transistors in the capacity adjusting device of FIG. 1.

FIG. 4 is a diagram illustrating continuous patterns of ON transistors among adjacent transistors. In FIG. 4, transistors are indicated by rectangular blocks. Here, adjacent transistors has the following meaning. For example, with Tr2 as the reference, Tr1 and Tr3 are the adjacent transistors. ON transistors refers to transistors that are turned ON, and OFF transistors refers to transistors that are turned OFF. In FIG. 4, pattern 1 shows the case when two ON transistors are sandwiched by OFF transistors. For example, transistors Tr1 and Tr4 are OFF, and transistors Tr2 and Tr3 are ON. As a result, adjacent transistors Tr2 and Tr3 correspond to pattern 1.

Also, pattern 2 shows the case when three ON transistors are sandwiched by OFF transistors. For example, transistors Tr4 and Tr8 are off, and transistors Tr5, Tr6 and Tr7 are ON. As a result, adjacent transistors Tr5-Tr7 correspond to pattern 2. Similarly, patterns 3-5 illustrate the cases when 4-6 ON transistors are sandwiched by OFF transistors. In FIG. 4, only patterns 1-5 are shown. However, this is merely an example. Actually, the maximum number of patterns depends on the number of transistors that are turned ON simultaneously, that is, the number of cells.

In the capacity adjustment device of the battery set in the first embodiment, in step S60, every other transistor is turned ON. In FIG. 4, OFF transistors are represented by a void, and ON transistors are represented by hatched portions. In FIG. 4, the number of the transistor is smaller for the transistor on the left. For example, when transistors Tr2-Tr5 correspond to pattern 3, transistors Tr3 and Tr5 are OFF, while transistors Tr2 and Tr4 are ON. During capacity adjustment, because the various patterns exist, for all of the transistors, every other ON transistor is turned OFF. In this case, for pattern 2 and pattern 4 when the consecutive ON transistor numbers are odd numbers, the number of ON transistors is larger than that of OFF transistors.

As explained above, based on the voltage values detected with voltage sensors V1-Vn, CPU 21 detects the state of operation of transistors Tr1-Trn. Consequently, it detects the pattern of the ON transistors, determines the transistors that should be turned OFF, and turns them OFF. As a result, adjacent cells do not undergo discharge, and the number of cells undergoing discharge is reduced. Consequently, the surface temperature of the control panel of battery controller 2 is lowered. Also, the treatment of step S60 is performed, the value of timer 23 is reset, and the time measurement is restarted.

Figure 5:
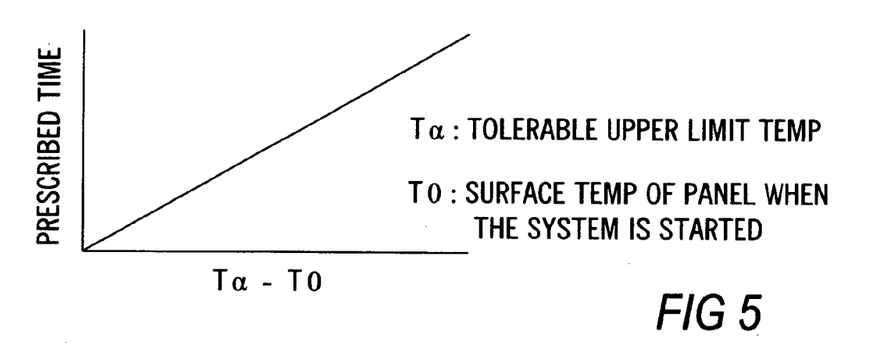
FIG. 5 is a graph of the temperature difference between maximum temperature Tα and temperature T0 detected with the temperature sensor when the vehicle is started versus the capacity adjustment time.

In step S70 after step S60, the capacity adjustment time is determined. FIG. 5 is a diagram illustrating the difference in temperature between the prescribed temperature Tα and the temperature T0 detected by temperature sensor 13 when the vehicle is started (i.e., the ambient temperature when the vehicle is started) versus the capacity adjustment time. This capacity adjustment time is determined as follows. The time during which the temperature of the control panel does not again rise to prescribed temperature Tα when the number of cells for discharge is reduced to perform capacity adjustment is determined beforehand from the Tα–T0 relationship, and it is stored as the capacity adjustment time table in memory 22. CPU 21 determines the capacity adjustment time based on the capacity adjustment time table stored in memory 22 and based on the temperature difference Tα–T0. After the capacity adjustment time is determined, the process goes to step S80.

In step S80, whether half the capacity adjustment time has lapsed is judged. This judgment is carried out based on the capacity adjustment time determined in step S70 and the time of start of measurement determined with timer 23 after treatment in step S60. If it is judged that half of the capacity adjustment time has not lapsed, the capacity adjustment is continued. On the other hand, if it is judged that half of the capacity adjustment time has lapsed, the process goes to step S90.

In step S90, the cells for capacity adjustment are changed. That is, in step S60, the OFF transistors (the transistors indicated by a void in FIG. 4) are turned ON, and the ON transistors (the transistors indicated by hatched portions in FIG. 4) are turned OFF. By switching ON/OFF the transistors, the cells for capacity adjustment are changed, and the process goes to step S100. In step S100, whether the capacity adjustment time has lapsed is judged, that is, whether the time for start of measurement by timer 23 has reached the capacity adjustment time after the treatment in step S60. If it is judged that the capacity adjustment time has not lapsed, capacity adjustment of the changed cells is continued. On the other hand, if it is judged that the capacity adjustment time has lapsed, the process goes to step S110.

In step S110, all of the transistors are turned OFF, the capacity adjustment of all of the cells comes to an end, and the process returns to step S10.

For the capacity adjusting device of a battery set in the first embodiment, when capacity adjustment is performed for plural cells s1-sn that form battery set 1, the discharge start timing of the capacity adjustment target cells (i.e., the cells that require adjustment) is controlled such that discharge is not started simultaneously for the cells to be discharged (capacity adjustment target cells). That is, the discharge of some target cells begins after the discharge of other cells commences. In other words, the discharge start timing is controlled so that discharge of adjacent cells is started asynchronously. As a result, it is possible to lower the rate of heat generation in the capacity adjustment. As a result, there is no need to improve the heat dissipation property of the control panel of battery controller 2 set near battery set 1. Consequently, it is possible to reduce the cost.

For the capacity adjusting device of the battery set in the first embodiment, plural capacity adjustment target cells are divided into two groups, namely, a first and a second group. First of all, capacity adjustment is started for the capacity adjustment target cells in the first group. Then, after completion of the capacity adjustment of the capacity adjustment target cells in the first group, the capacity adjustment of the capacity adjustment target cells of the second group is started. In this case, because the number of cells in the first group for capacity adjustment is larger than that of the second group, compared with the case of discharge of the cells of the first group, the rate of heat generation during discharge of the cells of the second group for capacity adjustment can be lower. As a result, when capacity adjustment is performed for the cells in the next round, it is possible to set the capacity adjustment time longer.

In addition, when the SOC of a battery set 1 is over a prescribed level, the treatment for dispersion of the timing for starting the capacity adjustment is not performed, so prevention of battery set 1 reaching the over-charged state is possible.

Second Embodiment

For the capacity adjustment device of the battery set in the first embodiment, after starting the capacity adjustment, if the temperature of the control panel rises to a prescribed temperature Tα, and the SOC of a battery set 1 is lower than a prescribed level, every other ON transistor is turned OFF. Then, the cells for capacity adjustment are changed so that capacity adjustment is performed with different capacity adjustment times. In the capacity adjusting device of a battery set of the second embodiment, by performing capacity adjustment for every other transistor it is possible to suppress a rise in the temperature of the control panel.

Figure 6:
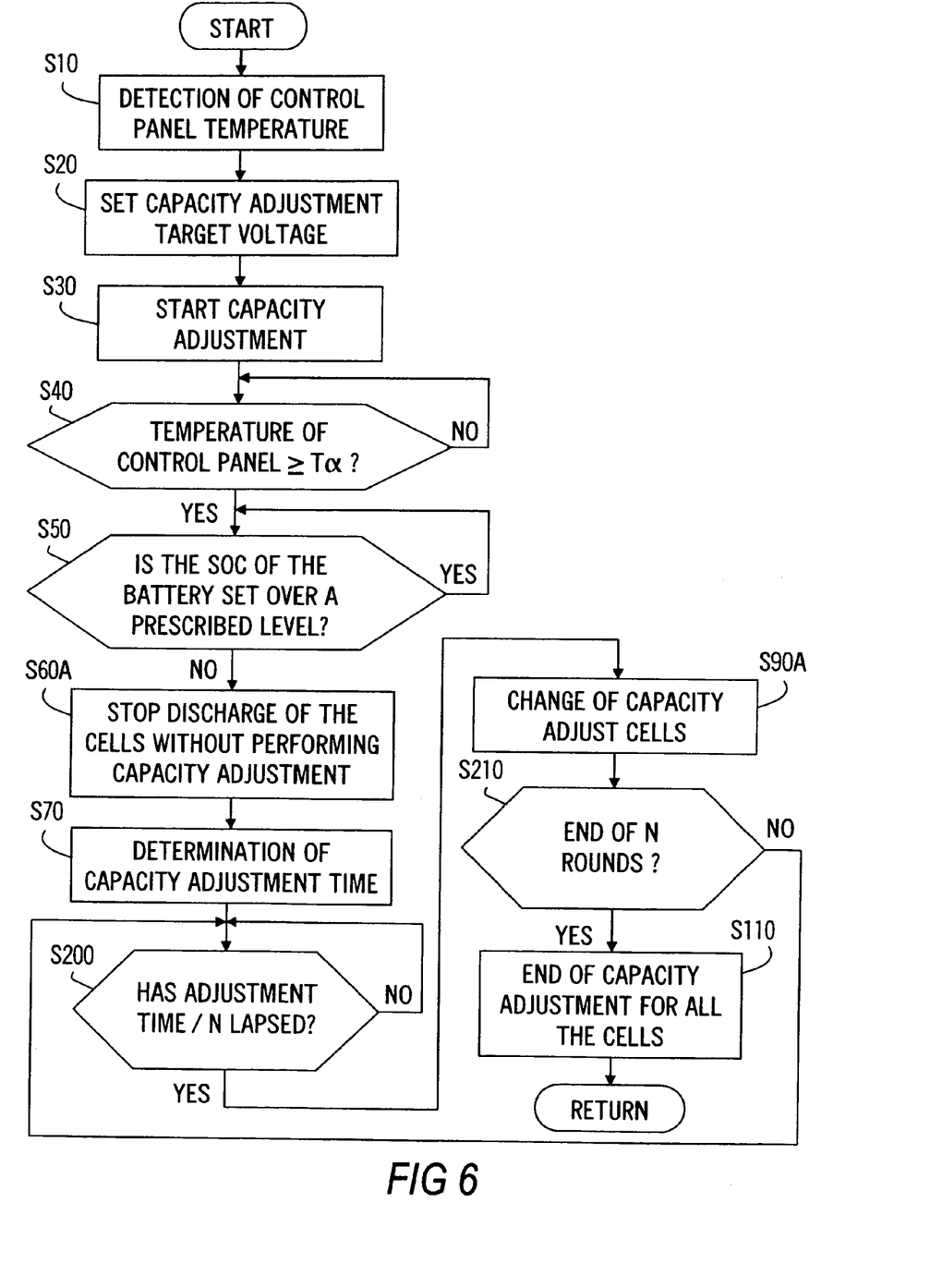
FIG. 6 is a flow chart illustrating the operation of a capacity adjusting device in accordance with a second embodiment of the invention.

FIG. 6 is a flow chart illustrating the contents of treatment by CPU 21 of battery controller 2 in the capacity adjusting device of a battery set in the second embodiment. The same part numbers as those used in the treatment of the flow chart shown in FIG. 3 are adopted, and they will not be explained again. The treatment of steps S10 S50 is the same as that of steps S10-S50 shown in FIG. 3.

Figure 7:
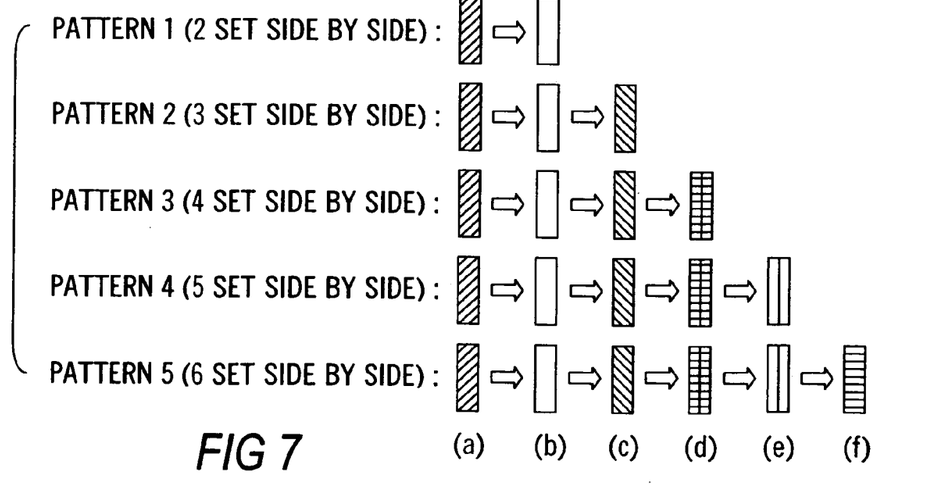
FIG. 7 is a diagram illustrating switching ON and OFF of the transistors in the capacity adjusting device in the second embodiment.

In step S60A after step S50, the cells without capacity adjustment are determined, and, for the determined cells, discharge is stopped. This treatment will be explained in more detail below. FIG. 7 is a diagram illustrating the treatment of staggering of capacity adjustment timing performed with the capacity adjustment device of the battery set in the second embodiment. In FIG. 7, too, just as in FIG. 4, the transistors are represented by rectangular blocks, and the adjacent ON transistors are indicated as patterns 1-5. Here, the maximum number of adjacent ON transistors is N.

In step S60A, for all of the patterns of adjacent ON transistors, among the adjacent ON transistors only the left-most transistor, that is, the transistor with the smallest number, is turned ON, while the remaining transistors are all turned OFF. In FIG. 7, only transistor (a) indicated by hatched portion is turned ON, and the other transistors are all turned OFF.

In step S70 after the treatment of step S60A, the capacity adjustment time is determined. Because the method for determining the capacity adjustment time has been explained above, no detailed explanation will be repeated. Once the capacity adjustment time is determined, the process goes to step S200. In step S200, whether 1/N of the capacity adjustment time determined in step S70 has lapsed is judged. As explained above, because the maximum number of adjacent ON transistors is N, in each 1/N of the capacity adjustment time, the cell for capacity adjustment is changed. Consequently, if it is judged that 1/N of the capacity adjustment time has not lapsed, discharge is continued for the cells connected in parallel to the ON transistors. If it is judged that 1/N of the capacity adjustment time has lapsed, the process goes to step S90A.

In step S90A, the cells for capacity adjustment are changed. As shown in FIG. 7, the neighboring transistor to the right of the ON transistor is turned ON, while the ON transistor is turned OFF. For example, when transistor (a) is ON, transistor (a) is turned OFF, and, at the same time, transistor (b) is turned ON. Also, when transistor (b) is ON, transistor (b) is turned OFF, and, at the same time, transistor (c) is turned ON.

When the treatment of step S60A is performed, for an OFF transistor, treatment for turning it ON is not performed. For example, for the transistors in pattern 1, when transistor (b) is ON, treatment is only performed to turn OFF transistor (b), and the neighboring transistor to the right of transistor (b) is not turned ON.

By performing the ON/OFF switching treatment of the transistors, the cells for capacity adjustment are changed, and the process then goes to step S210. In step S210, the adjacent ON transistors are switched one by one, and whether the ON treatment has been performed for N rounds is judged. If it is judged that N rounds of treatment have not been performed, the process returns to step S200, and the treatment for changing the cells for capacity adjustment is continued. On the other hand, if it is judged that the treatment has been performed for N rounds, the process goes to step S110. In step S110, all of the transistors are turned OFF, and capacity adjustment of all of the cells comes to an end. The process then returns to step S10.

In the capacity adjusting device of a battery set in the second embodiment, plural capacity adjustment target cells are divided into N groups. When capacity adjustment is finished for the capacity adjustment target cells in a group, capacity adjustment of the capacity adjustment target cells in another group is started. Consequently, it is possible to further reduce the rate of heat generation in capacity adjustment.

Figure 8:
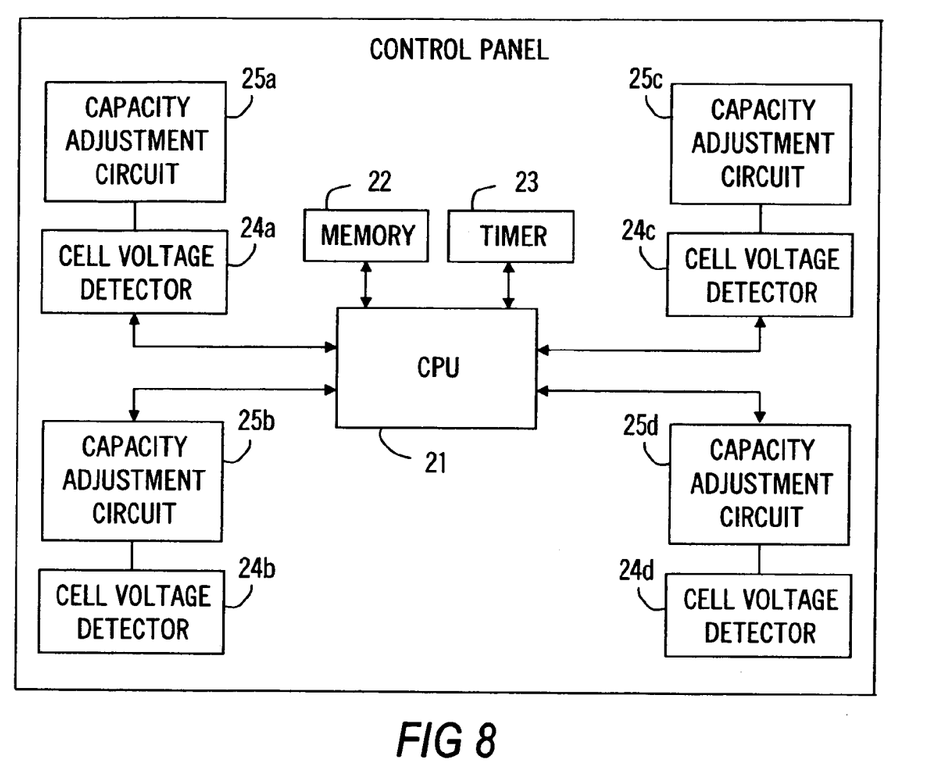
FIG. 8 is a block diagram illustrating a configuration of four capacity adjusting circuits and cell voltage detectors set on a single control panel.

The present invention is not limited to the first and second embodiments. For example, for the capacity adjustment circuit and the cell voltage detector, it is assumed that one of each of them is set on the control panel of battery controller 2 in the above explanation. However, it is also possible set a plurality of them. FIG. 8 is a diagram illustrating an example in which four each of capacity adjustment circuits and cell voltage detectors are set. That is, cells s1-sn are divided into four blocks. For each block, a capacity adjustment circuit 25a-25d and a cell voltage detector 24a-24d are respectively set. In this case, by setting the start timing of capacity adjustment and the timing for changing the cells for capacity adjustment identically for all blocks, complicated control by CPU 21a is not required. Also, by setting the blocks at the four corners of the control panel, it is possible to disperse the heat generated in capacity adjustment.

Figure 9:
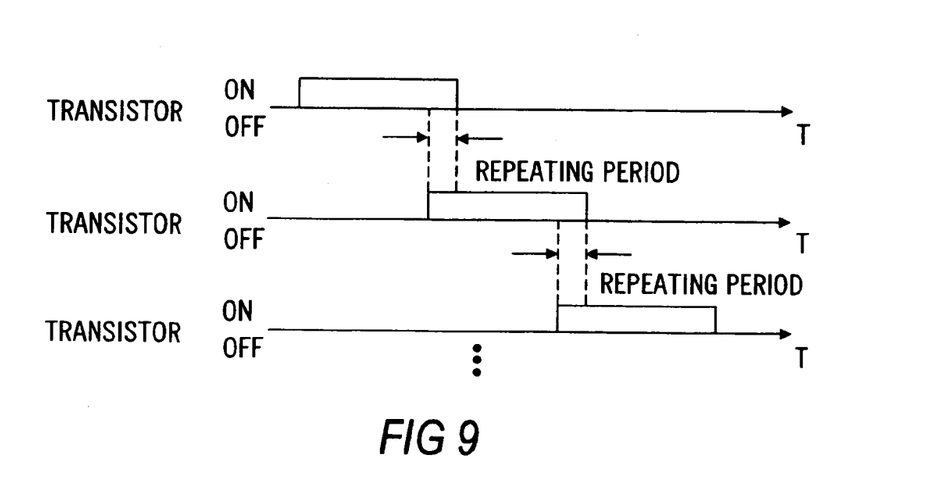
FIG. 9 is a timing chart of capacity adjustment periods when the capacity adjustment target cells are divided into multiple groups for capacity adjustment and the capacity adjustment periods partially overlap.

In the first and second embodiments, the capacity adjustment target cells are divided into two or more groups. Upon or sometime after completion of capacity adjustment of one group, capacity adjustment of the cells of another group is started. That is to say, the commencement of adjustment of the cells occurs asynchronously. However, it is also possible with such asynchronous adjustment for the capacity adjustment periods of the cells in different groups to slightly overlap but be still be offset with respect to start and stop times. FIG. 9 is a diagram illustrating the capacity adjustment period in the case of partial overlap of the capacity adjustment periods when the capacity adjustment target cells are divided into plural groups for capacity adjustment. In this case, too, it is possible to reduce the overall rate of heat generation in capacity adjustment. Also, after one adjustment of one group is completed there could be a delay until adjustment of the next group commences.

The temperature of the control panel of battery controller 2 is a substitute for the temperature of a battery set 1 detected by temperature sensor 13. However, it is also possible to set a specific temperature sensor for detecting the temperature of the control panel.

The corresponding relationship between the constitutional requirements of the claims and the constitutional requirements of the first and second embodiments is as follows. That is, CPU 21 is composed of a control means, a capacity adjustment time, and an SOC computing means. Also, the aforementioned explanation is merely an example, and the present invention is not limited to the aforementioned examples. There is no special limitation on the corresponding relationship between the constitutional requirement of the aforementioned embodiments and the constitutional requirement of the present invention.

This application is based on Japanese Patent Application No. 2004-358130, filed Dec. 10, 2004 in the Japanese Patent Office, the entire contents of which are hereby incorporated by reference.

Also, the above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for adjusting the capacity of a battery set having multiple cells including target cells that require capacity adjustment, comprising:
   a capacity adjusting circuit adapted for connection to the cells and responsive to the voltage of the target cells to asynchronously commence the discharge of the target cells until the voltage of the target cells reaches a prescribed level, the circuit further comprising
   a controller having an input configured to receive a temperature signal indicative of a temperature of the capacity adjusting circuit, a control output and a discharge circuit responsive to the control output for selectively discharging the target cells, and wherein the controller is adapted to:
   calculate a total capacity adjustment time based on the temperature;
   divide the target cells into a first group and a second group;
   set a capacity adjustment time of each group as a portion of the total capacity adjustment time;
   start capacity adjustment of the first group; and
   upon completion of the capacity adjustment of the first group, start capacity adjustment of the second group.

2. The apparatus of claim 1 wherein the controller is adapted to discharge adjacent target cells at different times such that one only target cell of the adjacent target cells is discharging at any one time.

3. The apparatus of claim 1 wherein the number of target cells in the first group is larger than the number of target cells in the second group.

4. The apparatus of claim 1 wherein the controller is further adapted to compute the SOC of the battery set; and wherein the control means inhibits capacity adjustment of the capacity adjustment target cells if the SOC is at least as great as a prescribed level.

5. An apparatus for controlling a battery set capacity adjustment circuit which adjusts capacity of cells by discharging the cells until the voltage of the cells are uniform, comprising:
- control means for controlling the start of discharge of the cells such that the discharge of cells does not start simultaneously when capacity adjustment is performed, the control means including:
- means for calculating a total capacity adjustment time based on a temperature of the capacity adjusting circuit;
- means for dividing the cells into a first group and a second group;
- means for setting a capacity adjustment time of each group as a portion of the total capacity adjustment time;
- means for starting capacity adjustment of the first group; and
- means for starting capacity adjustment of the second group upon completion of the capacity adjustment of the first group.

6. A vehicle, comprising:
- a battery set having multiple cells including target cells that require capacity adjustment;
- a capacity adjusting circuit coupled to the cells and adapted to discharge each cell in response to a control signal until the voltages of the cells are uniform; and
- a controller having an input configured to receive a temperature signal indicative of a temperature of the capacity adjusting circuit and the control signal as output and adapted to asynchronously commence discharge of the target cells, the controller further adapted to:
  - calculate a total capacity adjustment time based on the temperature;
  - divide the target cells into a first group and a second group;
  - set a capacity adjustment time of each group as a portion of the total capacity adjustment time;
  - start capacity adjustment of the first group using the capacity adjusting circuit; and
  - upon completion of the capacity adjustment of the first group, start capacity adjustment of the second group using the capacity adjustment circuit.

7. A method for controlling a battery set having multiple cells including target cells that require capacity adjustment, comprising:
- detecting a temperature associated with the battery set;
- calculating a total capacity adjustment time based on the temperature;
- detecting the voltage of the target cells;
- dividing the target cells into a first group and a second group;
- during a first time period, discharging the first group of target cells including at least a first target cell;
- during a second time period that is offset from the first time period, discharging second group of target cells including a second target cell;
- starting the first time period at a different time from a start of the second time period; and
- setting a duration of each of the time periods to a fraction of the total capacity adjustment time.

8. The method of claim 7, wherein the first and second target cells are selected to be adjacent cells in the battery set.

9. The method of claim 7, wherein the second time period commences after the first time period begins.

10. The method of claim 7, wherein the second time period commences no earlier than when the first time period ends.

11. The method of claim 7 wherein the number of target cells in the first group is larger than the number of target cells in the second group.

12. The method of claim 7, further comprising:
- dividing the target cells into a plurality of at least three groups;
- discharging each of the plurality of groups during a different one of a plurality of time periods, wherein each of the plurality of time periods is offset from each other.

13. The method of claim 12, wherein the time periods commence at successive start times.

14. The method of claim 12, wherein the time periods are sequential, with each time period commencing no earlier than when an immediately proceeding time period is substantially complete.

15. The method of claim 7 wherein each of the time periods is set to a duration equal to the total capacity adjustment time divided by the number of groups.

16. The method of claim 11, further comprising the steps of:
- determining the SOC of the battery set; and
- inhibiting adjustment of target cells if the SOC is over a prescribed level.

17. An apparatus for adjusting the capacity of a battery set having multiple cells including target cells that require capacity adjustment, comprising:
- a capacity adjusting circuit adapted for connection to the cells and responsive to the voltage of the target cells to asynchronously commence the discharge of the target cells until the voltage of the target cells reaches a prescribed level,
- wherein the capacity adjusting circuit further comprises a controller having an input configured to receive a temperature signal indicative of a temperature of the capacity adjusting circuit, a control output, and a discharge circuit responsive to the control output for selectively discharging at least one target cell, the controller adapted to:
  - divide the target cells into at least three groups;
  - calculate a total capacity adjustment time based on the temperature;
  - set the capacity adjustment time of each group as a portion of the total capacity adjustment time;
  - start capacity adjustment of the first group;
  - after starting capacity adjustment of the first group, start capacity adjustment of the second group;

18. The apparatus of claim 17 wherein the controller is further adapted to start capacity adjustment of the second group no earlier than when capacity adjustment time of the first group is substantially completed; and to start capacity adjustment of the third group no earlier than capacity adjustment time of the second group is substantially completed.

19. The apparatus of claim 18, wherein the controller sets the capacity adjustment time of each group to a value equal to the total capacity adjustment time divided by the number of groups.

* * * * *